US008359597B1

(12) United States Patent
John et al.

(10) Patent No.: US 8,359,597 B1
(45) Date of Patent: Jan. 22, 2013

(54) WORKLOAD-GUIDED APPLICATION SCHEDULING IN MULTI-CORE SYSTEM BASED AT LEAST ON APPLICATON BRANCH TRANSITION RATES

(76) Inventors: Lizy K. John, Austin, TX (US); Jian Chen, Austin, TX (US)

( * ) Notice: Subject to any disclaimer, the term of this patent is extended or adjusted under 35 U.S.C. 154(b) by 665 days.

(21) Appl. No.: 12/557,737

(22) Filed: Sep. 11, 2009

Related U.S. Application Data

(60) Provisional application No. 61/096,075, filed on Sep. 11, 2008.

(51) Int. Cl.
*G06F 9/46* (2006.01)
*G06F 15/18* (2006.01)
(52) U.S. Cl. .......................... 718/102; 718/107; 706/25
(58) Field of Classification Search .................. None
See application file for complete search history.

(56) References Cited

U.S. PATENT DOCUMENTS

| 7,093,147 | B2 * | 8/2006 | Farkas et al. ................... 713/320 |
| 7,802,236 | B2 * | 9/2010 | Calder et al. ................... 717/130 |
| 7,996,346 | B2 * | 8/2011 | Bell et al. ....................... 718/102 |
| 7,996,839 | B2 * | 8/2011 | Farkas et al. ................... 718/102 |

OTHER PUBLICATIONS

Ballapuram, Sharif and Lee, "Exploiting Access Semantics and Program Behavior to Reduce Snoop Power in Chip Multiprocessors," Proceedings of 13th International Conference on Architectural Support for Programming Languages and Operating Systems, pp. 60-69, Mar. 2008.

Brooks, Tiwari, and Martonosi, "Wattch: A Framework for Architectural Level Power Analysis and Optimizations," 27th International Symposium on Computer Architecture, Jun. 2000.
Chen, Nayyar, and John, "Mapping of Applications to Heterogeneous Multi-cores Based on Micro-architecture Independent Characteristics," Third Workshop on Unique Chips and Systems, ISPASS2007. Apr. 2007.
Haungs, Sallee, and Farrens, "Branch transition rate: a new metric for improved branch classification analysis," Proceedings. Sixth International Symposium on High-Performance Computer Architecture. HPCA-6., pp. 241-250, 2000.
Hofstee, "Power efficient processor architecture and the cell processor," 11th International Symposium on High-Performance Computer Architecture, HPCA-11. pp. 258-262, Feb. 2005.
Ipek, Kirman, Kirman, and Martinez. "Core Fusion: Accommodating software diversity in chip multiprocessors," In Intl. Symposium. on Computer Architecture, San Diego, CA, Jun. 2007.
Kim, Sethumadhavan, Govindan, Ranganathan, Gulati, Burger, and Keckler, "Composable Lightweight Processors," 40th Annual IEEE/ACM International Symposium on Microarchitecture, pp. 381-394, 1-5 Dec. 2007.
Kumar, Farkas, Jouppi, Ranganathan, and Tullsen, "Single-ISA Heterogeneous Multi-core Architectures: The Potential for Processor Power Reduction," In International Symposium on Microarchitecture, Dec. 2003.
Kumar, Tullsen, Jouppi, "Core architecture optimization for heterogeneous chip multiprocessors," Proceedings of the 15th international conference on Parallel architectures and compilation techniques, Sep. 2006.

(Continued)

*Primary Examiner* — Meng An
*Assistant Examiner* — Bing Zhao

(57) ABSTRACT

The proposed method exploits inherent characteristics of a software program to select a core of a multi-core processor for executing the software program. Each characteristic is associated with a suitability metric, which measures the degree of the match between that characteristic and the corresponding hardware configuration. In one embodiment, fuzzy logic is used to combine individual metrics to produce an overall suitability that indicates the overall degree of the match between a program and a core.

18 Claims, 13 Drawing Sheets

OTHER PUBLICATIONS

Lafage, and Seznec, "Choosing Representative Slices of Program Execution for Microarchitecture Simulations: A Preliminary Application to the Data Stream," Workshop on Workload Characterization (WWC-2000), Sep. 2000.

Maheswaran, and Siegel, "A Dynamic Matching and Scheduling Algorithm for Heterogeneous Computing Systems," Proc. Heterogeneous Computing Workshop, pp. 57-69, 1998.

Perelman, Hamerly and Calder, "Picking Statistically Valid and Early Simulation Points," In the International Conference on Parallel Architectures and Compilation Techniques, Sep. 2003.

Phansalkar, Joshi, Eeckhout, and John, "Measuring Program Similarity: Experiments with SPEC CPU Benchmark Suites," IEEE International Symposium on Performance Analysis of Systems and Software. pp. 10-20. Mar. 2005.

Siegel, et al., "Computing with heterogeneous parallel machines: advantages and challenges," Proceedings. Second International Symposium on Parallel Architectures, Algorithms, and Networks, Jun. 12-14, 1996.

* cited by examiner

WORKLOAD-GUIDED APPLICATION SCHEDULING IN MULTI-CORE SYSTEM BASED AT LEAST ON APPLICATON BRANCH TRANSITION RATES

CROSS-REFERENCE TO RELATED APPLICATIONS

This application claims benefit of and priority to U.S. Provisional Patent Application No. 61/096,075, filed Sep. 11, 2008, which is fully incorporated herein by reference.

GOVERNMENT SUPPORT CLAUSE

This invention was made with government support under 0702694 awarded by the National Science Foundation. The government has certain rights in the invention.

BACKGROUND

Employing heterogeneity in multi-core processor design has been demonstrated to be an effective approach toward power efficient computing. By integrating different types of cores in a single chip, a heterogeneous multi-core processor can provide the architectural capability to accommodate diverse computational requirements of a program. It achieves efficient computing by running the program on the core that can be most suitable for its execution in terms of energy delay product (EDP).

While the heterogeneous multi-core system provides the architectural support to match the programs' diverse resource requirements, it can be the program scheduling mechanism that leverages this architecture opportunity to provide energy efficient computing. A program scheduling mechanism that considers power and performance can be helpful in efficiently parsing programs to the multi-core processor.

Prior research on program scheduling in heterogeneous systems mainly focused on scheduling the subtasks of the programs in order to minimize the overall subtask execution time. This execution time driven scheduling mechanism is not as desirable in modern heterogeneous multi-core processors since power consumption, in addition to the performance, has become a consideration in designing a scheduling algorithm.

Therefore, systems and methods are desired for efficiently utilizing multi-core processors in executing applications that overcome challenges in the art, some of which are described above.

SUMMARY

In one embodiment, provided is a suitability-based approach to leverage a relationship between programs and cores for program scheduling in heterogeneous multi-core processors.

In another embodiment, provided is a model for measuring the suitability between each characteristic and its corresponding hardware configuration.

In yet another embodiment, provided are methods and systems that can employ fuzzy logic to determine an overall suitability to guide program scheduling for efficient computing in heterogeneous multi-core environments.

Additional advantages will be set forth in part in the description which follows or may be learned by practice. The advantages will be realized and attained by means of the elements and combinations particularly pointed out in the appended claims. It is to be understood that both the foregoing general description and the following detailed description are examples and explanatory only and are not restrictive, as claimed.

BRIEF DESCRIPTION OF THE DRAWINGS

The accompanying drawings, not drawn to scale, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, specific systems or to particular compositions. It is also to be understood that the terminology used herein is for the purpose of describing particular embodiments only and is not intended to be limiting.

As used in the specification and the appended claims, the singular forms "a", "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

"Exemplary" means "an example of" and is not intended to convey a meaning of an ideal or preferred embodiment. Further, the phrase "such as" as used herein is not intended to be restrictive in any sense, but is merely explanatory and is used to indicate that the recited items are just examples of what is covered by that provision. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of embodiments and the examples included therein and to the figures and their previous and following description.

Figure 1:
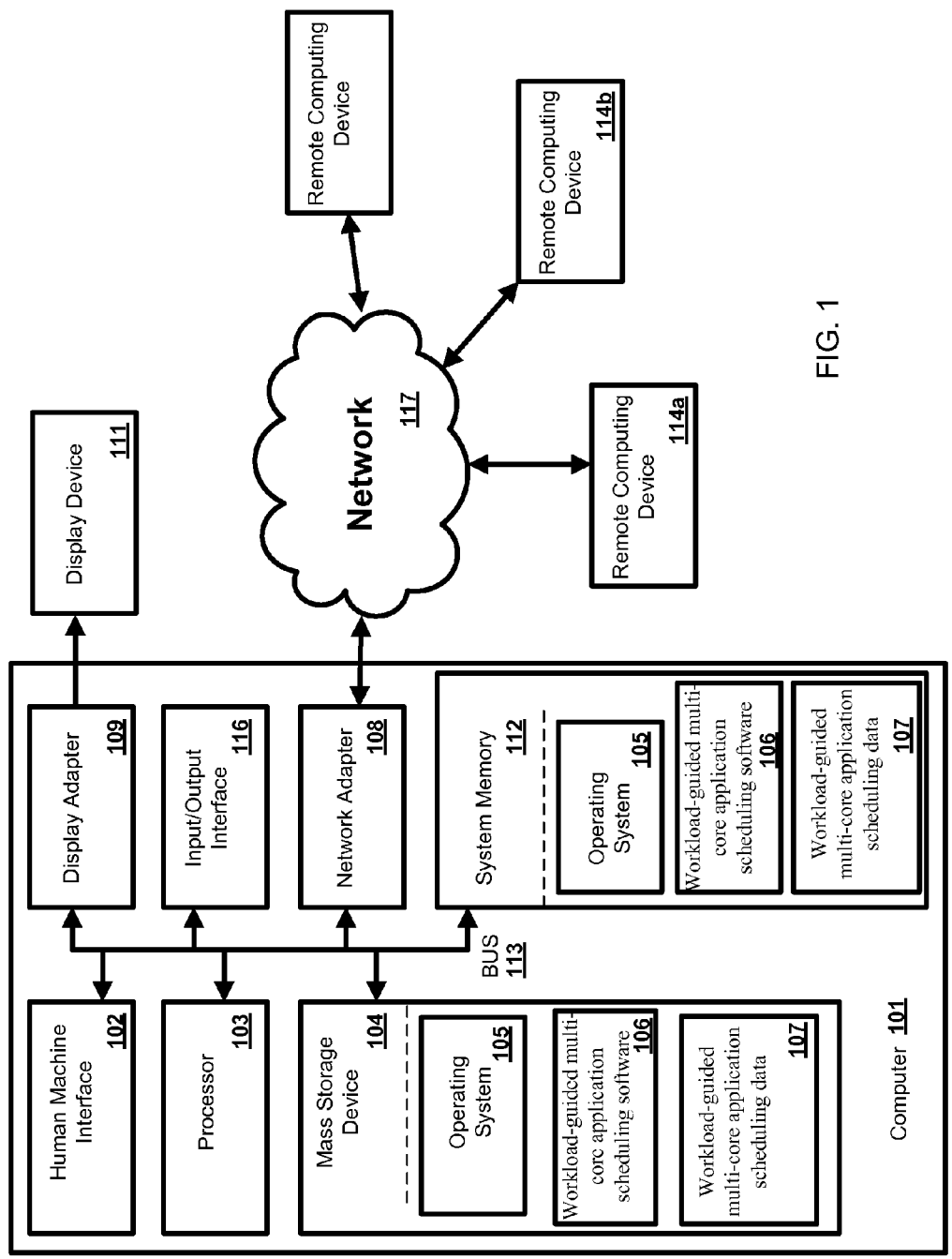
FIG. 1 is a block diagram illustrating an exemplary operating environment for performing the disclosed method.

The system is described herein as comprised of units. One skilled in the art will appreciate that this is a functional description and that the respective functions can be performed by software, hardware, or a combination of software and hardware. A unit can be software, hardware, or a combination of software and hardware. The units can comprise workload-guided multi-core application scheduling software 106 as illustrated in FIG. 1 and described below. In one exemplary aspect, the units can comprise a computer 101 as illustrated in FIG. 1 and described below.

FIG. 1 is a block diagram illustrating an exemplary operating environment for performing the disclosed method. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the system and method disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112. The processor 103 can contain non-identical multiple cores. Such a processor 103 is referred to as a heterogeneous multi-core processor. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card Industry Association (PCMCIA) bus, Universal Serial Bus (USB) and the like. The bus 113, and all buses specified in this description can also be implemented over a wired or wireless network connection and each of the subsystems, including the processor 103, a mass storage device 104, an operating system 105, workload-guided multi-core application scheduling software 106, workload-guided multi-core application scheduling data 107, a network adapter 108, system memory 112, an Input/Output Interface 116, a display adapter 109, a display device 111, and a human machine interface 102, can be contained within one or more remote computing devices 114a, b, c at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as workload-guided multi-core application scheduling data 107 and/or program modules such as operating system 105 and workload-guided multi-core application scheduling software 106 that are immediately accessible to and/or are presently operated on by the processing unit 103.

In another aspect, the computer 101 can also comprise other removable/non-removable, volatile/non-volatile computer storage media. By way of example, FIG. 1 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and workload-guided multi-core application scheduling software 106. Each of the operating system 105 and workload-guided multi-core application scheduling software 106 (or some combination thereof) can comprise elements of the programming. Workload-guided multi-core application scheduling data 107 can also be stored on the mass storage device 104. Workload-guided multi-core application scheduling data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 116. Any step and/or result of the methods can be output in any form to an output device. Such output can be any form of visual representation, including, but not limited to, textual, graphical, animation, audio, tactile, and the like.

The computer 101 can operate in a networked environment using logical connections to one or more remote computing devices 114a, b, c. By way of example, a remote computing device can be a personal computer, portable computer, a server, a router, a network computer, a peer device or other common network node, and so on. Logical connections between the computer 101 and a remote computing device 114a, b, c can be made via a local area network (LAN) and a general wide area network (WAN). Such network connections can be through a network adapter 108. A network adapter 108 can be implemented in both wired and wireless environments. Such networking environments are conventional and commonplace in offices, enterprise-wide computer networks, intranets, and the Internet 117.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of workload-guided multi-core application scheduling software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Computer processors can be configured with multiple processor cores. A plurality of computer programs may run on a computer and an operating system on the computer can be tasked with determining which program runs on which core. In one embodiment of the methods and systems described herein, a mathematical system that analyzes programs to determine which core they should be assigned to. The mathematical system, referred to as a fuzzy system or fuzzy logic, can be utilized to determine a desired assignment of applications to cores.

In some instances, existing scheduling methods do not adequately exploit the relationship between a program's inherent characteristics and its hardware resource requirements. For example, consider the instruction dependency distance (the number of instructions between the producer of a data and its consumer) distribution of a program. Standard Performance Evaluation Corporation (SPEC), (Warrenton, Va.), provides a publicly available standardized set of relevant benchmark programs to assess computer performance. SPEC is a non-profit corporation formed to establish, maintain and endorse a standardized set of relevant benchmarks that can be applied to high-performance computers. SPEC develops benchmark suites and also reviews and publishes submitted results from member organizations and other benchmark licensees. The SPEC benchmarks, as applicable to the embodiments described herein, are incorporated by reference.

Figure 2A:
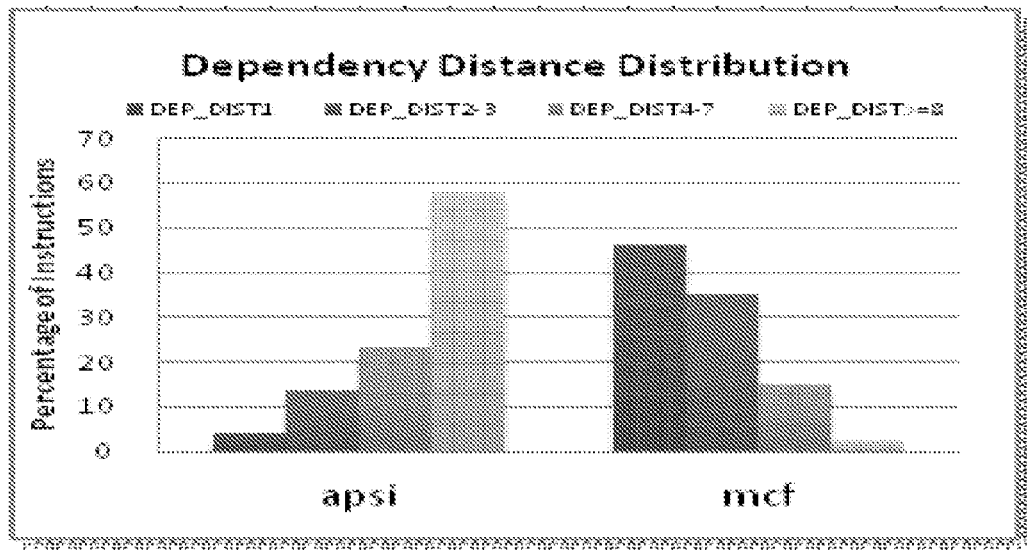
FIGS. 2A and 2B illustrate simplified, non-limiting examples of instruction dependency distance distribution and execution time reduction of benchmark programs apsi and mcf.
Figure 2B:
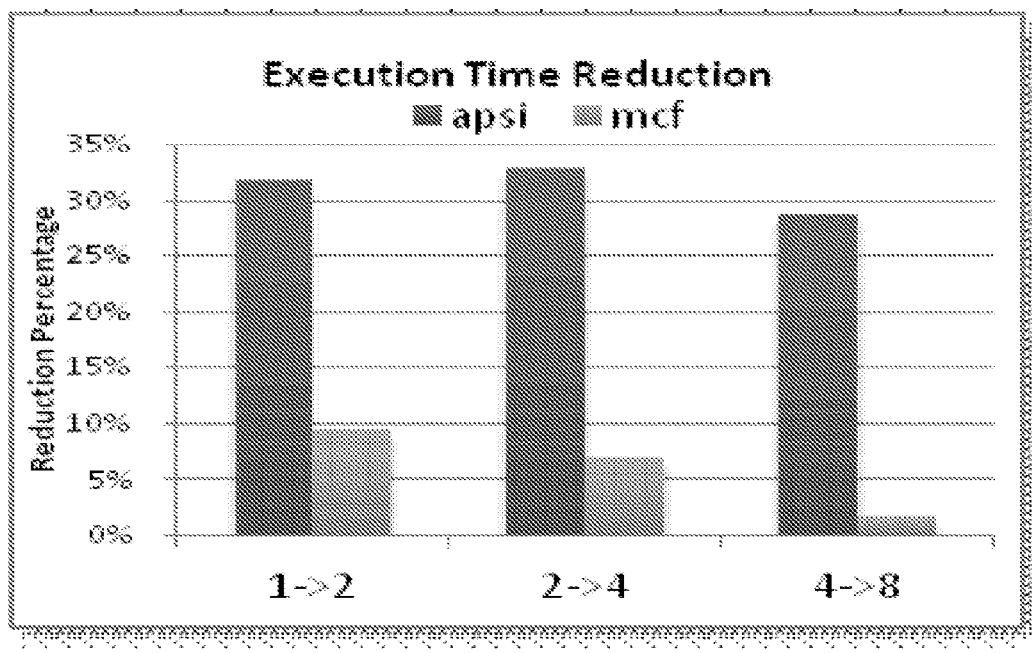

As shown in FIG. 2A, the SPEC benchmark apsi had a large percentage of instructions with long dependency distance, while mcf had a high percentage of instructions with short dependency distance. These two opposite trends in dependency distance distribution indicate different amounts of instruction level parallelism (ILP) in these two programs, and hence different requirements of instruction issue width on the processor core, where issue width is the number of instructions a processor can fetch in one cycle. As shown in FIG. 2B, apsi demonstrated a near constant reduction rate in execution time as the instruction issue width went from 1 to 8. This was because the program had sufficient ILP, as indicated in the dependency distance distribution, to keep up with the issue width scaling, and hence favored a processor core with large issue width. On the other hand, mcf had a significantly lower reduction rate in execution time, and the amplitude of the rate sharply decreased as the instruction issue width increased which means the program is more suitable to run on a processor core with small issue width.

The methods and systems provided can exploit one or more inherent characteristics of a computer-executable program. Each characteristic can be associated with a suitability metric, which can measure a degree of a match between that characteristic and a corresponding hardware configuration.

Figure 3:
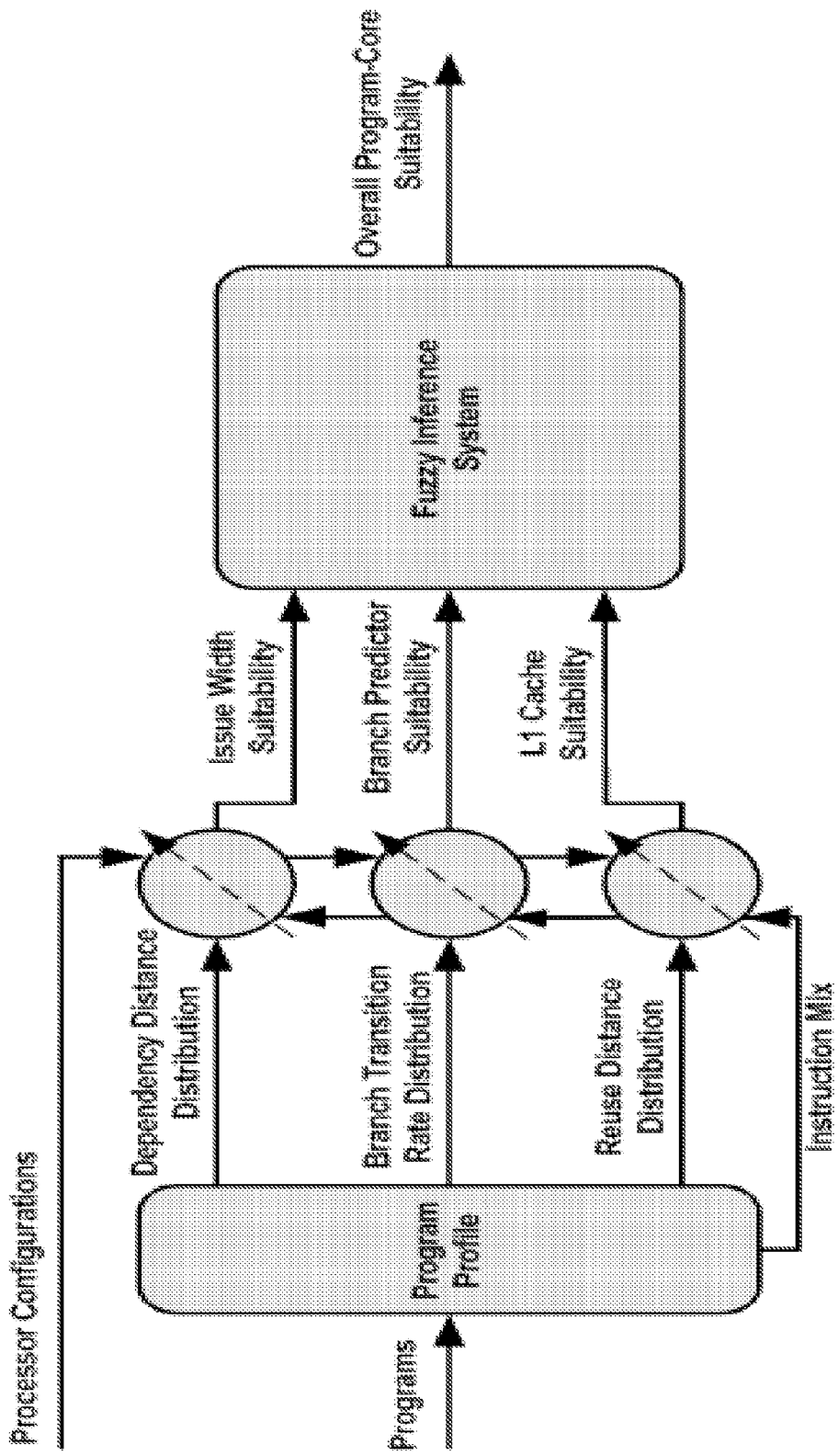
FIG. 3 illustrates a simplified, non-limiting example of the overall flow to generate the program-core suitability.

As illustrated in FIG. 3, the methods provided can profile a program by, for example, obtaining one or more micro-architecture independent program characteristics. Micro-architecture independent program characteristics can be, for example, a dependency distance distribution which is the number of instructions between the producer of data and the consumer of said data. Additionally, a characteristic can be a reuse distance distribution, which is based on reuse distances for addresses. The reuse distance for an address can be the number of unique memory accesses between a memory access to that block address and the next time that same block address is accessed again. Or, a characteristic can be a branch transition rate distribution which is the number of times a branch changes direction between taken and not taken directions, during execution. FIG. 3 illustrates an overall flow to generate program-core suitability. As shown in FIG. 3, an instruction mix is used to tune suitability degrees of multiple program characteristics.

These micro-architecture independent program characteristics can determine, for example, the ILP, the data locality, the branch predictability of the program, which can define the program's overall resource demands The profiled characteristics, coupled with the corresponding hardware configurations, can be used to generate a suitability metric for issue width, cache size and branch predictor size, as described herein. These suitability metrics can be processed by a fuzzy inference system, as described herein, where they can be integrated with an intelligent rule system, to produce an overall suitability metric that can represent a degree of the match between the program and the core.

Instruction Dependency Distance and Issue Width Suitability

The issue width suitability metric can measure the match between the program's ILP and the processor's issue width. The program's ILP can be obtained by determining instruction dependency distance, which can be defined as the total number of instructions in the dynamic instruction stream between the producer and the first consumer of a register instance. Unlike the conventional read-after-write (RAW) dependency distance, the instruction dependency distance followed by this definition excludes the non-critical RAW dependencies, and hence can be more accurate in representing the program's ILP. For a given dependency distance distribution, the higher the percentage of instructions with long dependency distance is, the larger the amount of ILP can be in the program.

In one embodiment, to determine issue width suitability, the dependency distances can be classified into groups according to the dependency distance distribution. The distances can be divided into one or more groups. For example, the distances can be divided into four groups. Group 1 can comprise distances of 1, group 2 can comprise distances of 2-3, group 3 can comprise distances of 4-7, and group 4 can comprise distances of 8 and larger. Each group can exploit its parallelism by exploiting a suitable issue width. For example, assume an issue width of 1 for group 1, an issue width of 2 for group 2, an issue width of 4 for group 3, and an issue width of 8 for group 4. Let issue width index $X_i$, i=1 ... 4, represent the issue widths 1, 2, 4 and 8, then the mass center (or the weighted average) of the distribution can be $\Sigma_{i=1}^{4} P_i * X_i / \Sigma_{i=1}^{4} P_i$, where Pi is the percentage of instructions whose dependency distance falls in group i. This mass center of the distribution can indicate where the program resides on a range of issue widths. Therefore, the distance between the mass center and the index representing a certain issue width indicates how close the program's ILP matches the core's issue width, and hence can be the degree of issue width suitability when mapping the program to that particular core. An equation for determining the degree of issue width suitability can be shown as follows:

$$IssueWidthSuitability(i) = \left| x_i - \sum_{i=1}^{4} P_i * \frac{X_i}{\sum_{i=1}^{4} P_i} \right| \quad (1)$$

The degree of issue width suitability can be applied in the fuzzy inference system by complementing the corresponding conditions in the fuzzy rule base as described herein.

Branch Transition Rate and Branch Predictor Suitability

A branch predictor suitability metric can determine a match between a program's branch predictability and a branch predictor size. If a branch predictor contains 1K entries to store prediction information, the branch predictor size is 1K. Branch predictors of sizes 1K, 2K, 4K, and 8K are herein used as examples. However, predictors of other sizes can be used with the methods and systems described. In one embodiment, to capture a branch predictability of a program, a branch transition rate can be used. Branch instructions with extremely low and extremely high branch transition rates can be predicted with a small branch predictor because the branch history pattern of these instructions can be captured with short history registers. However, as the branch transition rate approaches 50%, predicting the branch results can be more difficult since a longer history register can be required to capture the history pattern of these branch instructions. In yet another embodiment, the branch transition rates can be evenly divided into one or more buckets. For example, the branch transition rates can be divided into ten buckets. The buckets can comprise [0, 0.1], [0.1, 0.2], [0.2, 0.3], [0.3, 0.4], [0.4, 0.5], [0.5, 0.6], [0.6, 0.7], [0.7, 0.8], [0.8, 0.9], [0.9, 1.0]. Branch instructions in the buckets [0.4, 0.5] and [0.5, 0.6] can be difficult to predict, as such, these buckets can be associated with the largest branch predictor. The branch instructions in the buckets [0.3, 0.4] and [0.6, 0.7] can be easier to predict, and these buckets can be associated with a smaller branch predictor. The same concept can be applied in buckets [0.2, 0.3] and [0.7, 0.8], and buckets [0.1, 0.2] and [0.8, 0.9]. The following exemplary equation can be used to determine branch predictor suitability:

$$BranchSuitability(i) = \left| B_i - \frac{B_1*(P_2+P_9) + B_2*(P_3+P_8) + B_3*(P_4+P_7) + B_4*w*\sum_{i=5}^{6} P_i}{\sum_{i=2}^{4} P_i + \sum_{i=7}^{9} P_i + w*\sum_{i=5}^{6} P_i} \right| \quad (2)$$

where $B_i$, i=1 . . . 4, are the indices representing the sizes of the branch predictors, organized in an increasing order with $B_1$ as the smallest and $B_4$ as the largest. While the methods and system described herein contain four different sized branch predictors of the same type, they can be used for a plurality of different branch predictors and are not limited to a specific number of branch predictors. In one embodiment, the buckets [0, 0.1] and [0.9, 1] are not considered because branch instructions in this range can be more predictable than other ranges, and even the smallest branch predictor can be adequate. The parameter w can be used to tune the weight of the largest branch predictor, and can equal $\alpha \times P_{cond}$. $\alpha$ can be an empirically determined value, and can increase as the instruction issue width increases. $\alpha$ can also be used to keep track of the relationship between the widening issue width and the increases in branch misprediction penalty. As the $\alpha$ value increases, a larger branch predictor with higher prediction accuracy can become increasingly desirable. $P_{cond}$ cond can be the percentage of the conditional branches in the instruction mix. A large $P_{cond}$ can lead to a large number of hard-to-predict branches, and hence the weight of large branch predictor can be high.

Equation (2) can be used to determine the distance between the mass center of the branch transition rate distribution and the index representing a certain branch predictor size. In one implementation, if four branch predictors are being considered, the indices can be 0.125, 0.25, 0.5, and 1. These indices correspond to the size of the branch predictors normalized with respect to the biggest size being considered. For each computer program under consideration, the distance from the mass center of the branch transition rate distribution to the branch predictor size index is computed. A higher distance can imply less suitability towards that type of branch predictor. Therefore, the corresponding conditions in the fuzzy rule base can be complemented before using this distance as the suitability for the branch predictor.

Data Reuse Distance and L1 Data Cache Suitability

Cache suitability can measure a degree of a match between a program's data locality and a cache size. The program's data locality can be characterized by a data reuse distance distribution of the accesses of the program. The reuse distance for an address can be defined as a number of unique memory accesses between one access to an address and the next access to the same block address. In one embodiment, by grouping the memory accesses in terms of their reuse distances, the methods and systems can determine a reuse distance distribution, which can provide percentages of the data accesses with a certain reuse distance among the total data accesses. In another embodiment, when there is no well defined relationship between the reuse distance and the corresponding L1 cache size, the mass center may not be effective in computing cache suitability. L1 cache is typically a small, fast memory cache that is built in to a CPU and helps speed access to important and frequently-used data. A different metric, cache efficiency, can be used to measure the suitability between the locality of the program and the L1 cache size. The cache efficiency can be defined as $P_{R<C}/C$, where C is the L1 data cache size and $P_{R<C}$ is the percentage of the data accesses with reuse distance less than C. The cache efficiency can determine how much program locality per unit cache size captures. By way of example, the value of cache suitability can be in the range between 0 and 1, the cache efficiency can be normalized before it can be used as the cache suitability, which can be shown in the following equation:

$$CacheSuitability(i) = \frac{P_{R<Ci}/C_i}{(P_{R<C}/C)_{max}} \quad (3)$$

where $C_i$ is the L1 data cache size of core i in a heterogeneous multi-core processor, and $(P_{R<C}/C)_{max}$ can be the largest cache efficiency a program can have when it is mapped to the cores with different L1 data cache sizes.

In one embodiment, the methods and systems can employ fuzzy logic to combine individual suitability metrics to produce an overall suitability metric that can indicate the overall degree of a match between a program and a core. Fuzzy logic can use linguistic "IF-THEN" rules, and can be applicable in situations such as the matching of programs and cores, where well-defined deterministic mathematical models are unavailable.

Fuzzy Inference System (FIS)

Figure 4:
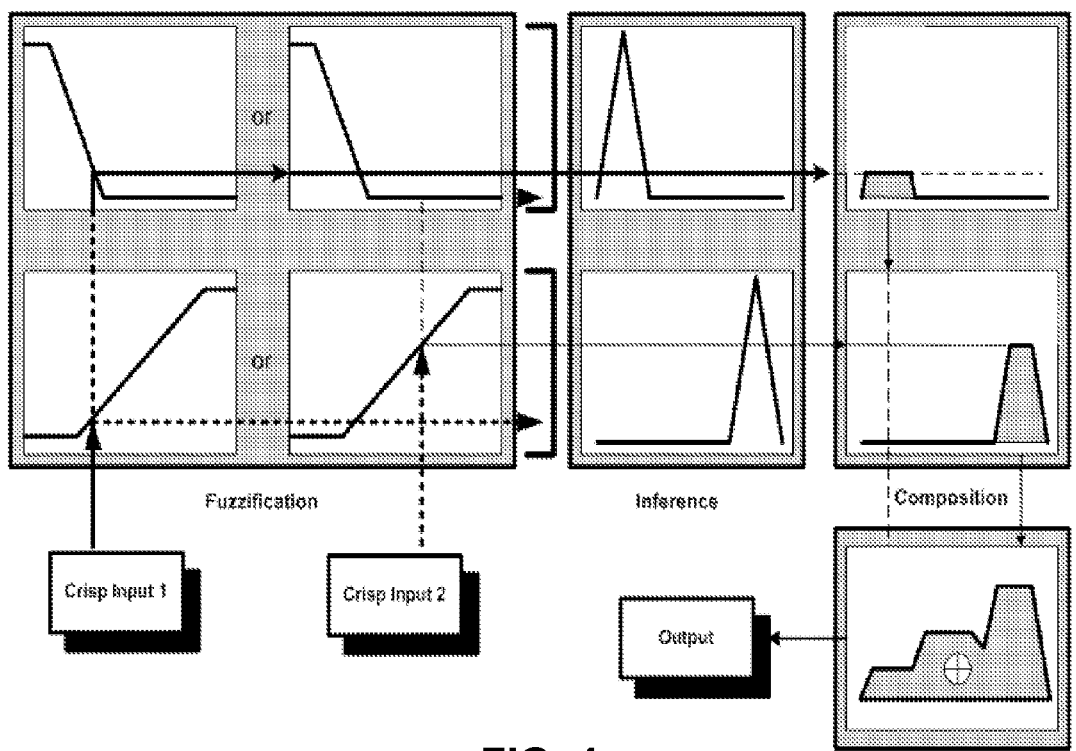
FIG. 4 illustrates a simplified, non-limiting block diagram of steps in a fuzzy inference system.

Unlike Boolean logic, a fuzzy inference system can use a collection of membership functions and built-in linguistic rules to map inputs to an output. The system can be generally described in four broad steps: fuzzification, inference, composition, and defuzzification. FIG. 4 illustrates a non-limiting diagram of an embodiment of a fuzzy inference system for the disclosed methods comprising the steps of receiving inputs, fuzzification, inference, composition and defuzzification.

As shown in FIG. 4, in one embodiment, rules representing human knowledge can be reasoned with fuzzy sets; accordingly, the fuzzification process can transform crisp input values into fuzzy degrees via an input membership function evaluation. In the inference step, fuzzy operators (e.g., AND or OR) can be applied to two or more fuzzified input variables to obtain a number that can represent the result of the premise for the rule. This number can be used to truncate the corresponding output fuzzy set representing the output of the rule. The truncated fuzzy sets can be aggregated into a single fuzzy set during the composition step. The defuzzification process can convert this single fuzzy set back to a crisp value, by calculating the center of the area under the curve.

Implementation of FIS

In yet another embodiment, the FIS can convert suitability metrics, for example, the issue width suitability metric, the cache suitability metric, and the branch predictor suitability metric, to an overall suitability metric for a program-core pair. Program-core pairs, for a non-limiting example, can be (p,B), (q,D), (r,A) and (s,C) where A, B, C, D are cores and p, q, r, s are programs that are assigned to the respective core based on the fuzzy system determination.

Figure 5:
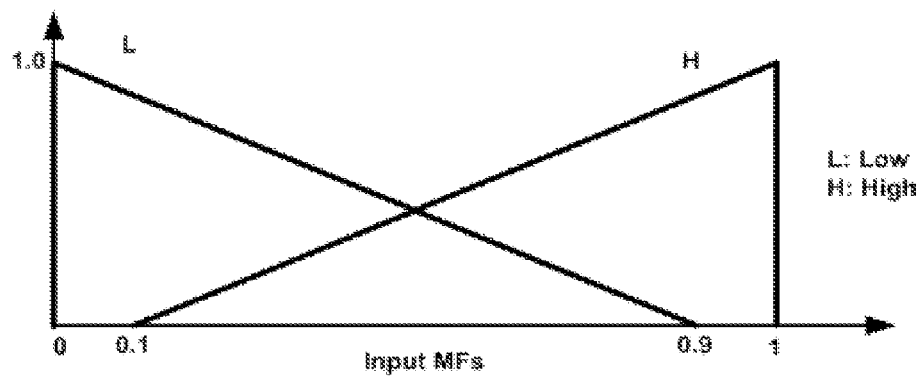
FIG. 5 illustrates a simplified, non-limiting example of input and output membership functions.
Figure 5:
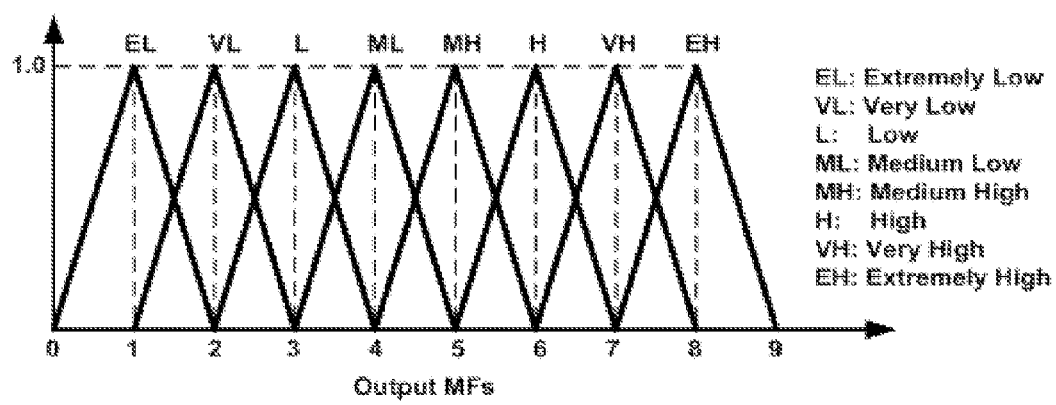

The suitability metric can be assigned to a plurality of possible fuzzy sets, such as "low" and "high," resulting in eight output membership functions. FIG. 5 illustrates exemplary input and output membership functions where the output membership functions divide the range [0,1] into eight equal segments. As shown in FIG. 5, the input membership functions can be designed such that both "low" and "high" are triangle-shaped with "low" covering any value between 0 and 0.9 and "high" covering any value between 0.1 than 1.0. Additionally, each output membership function can be associated with a name, which can be used in the rules to represent the linguistic meaning of the suitability level.

Figure 6A:
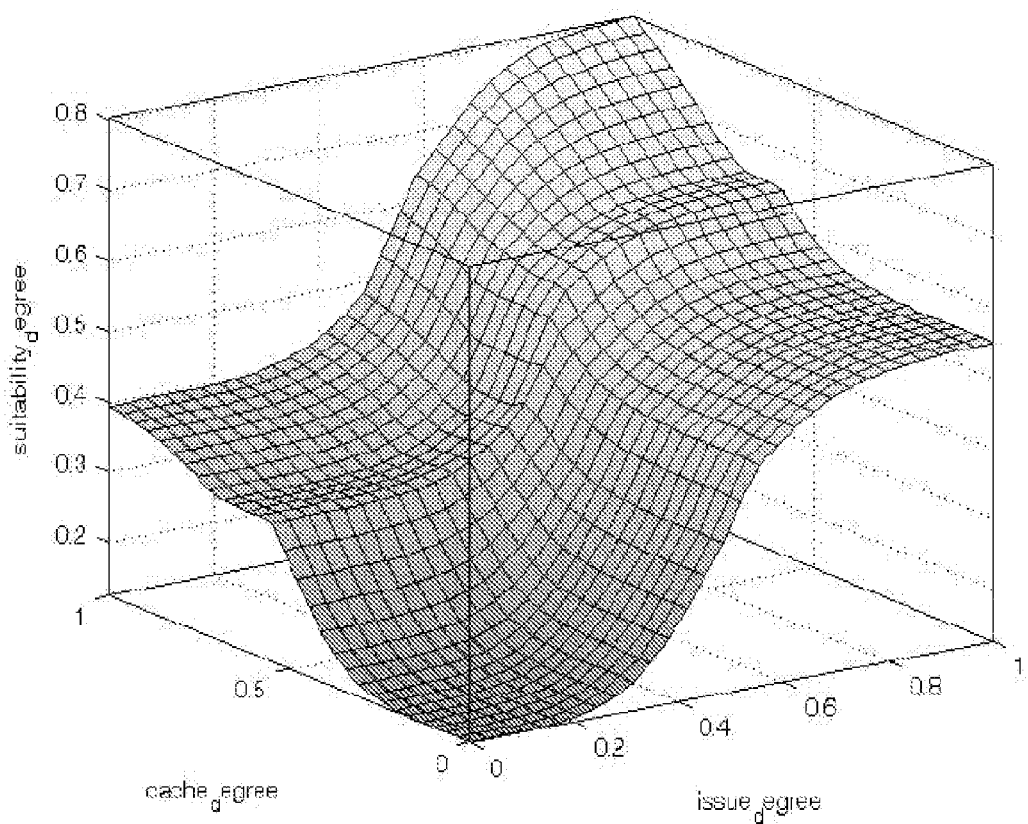
FIGS. 6A, 6B and 6C illustrate non-limiting examples of response surfaces of the fuzzy interface system.
Figure 6B:
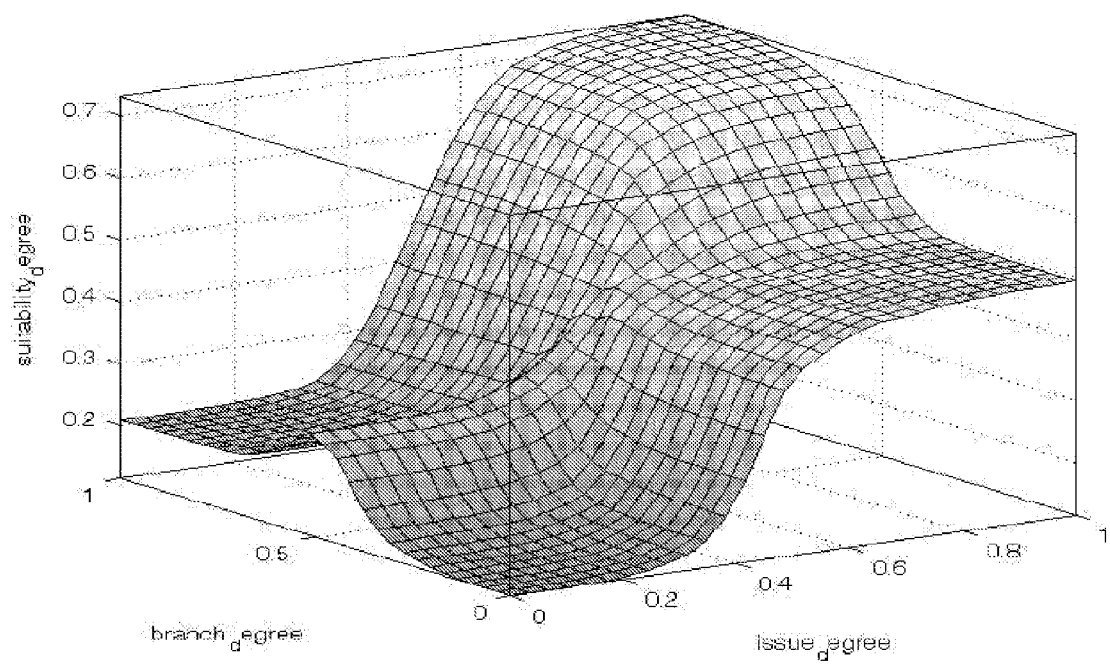
Figure 6C:
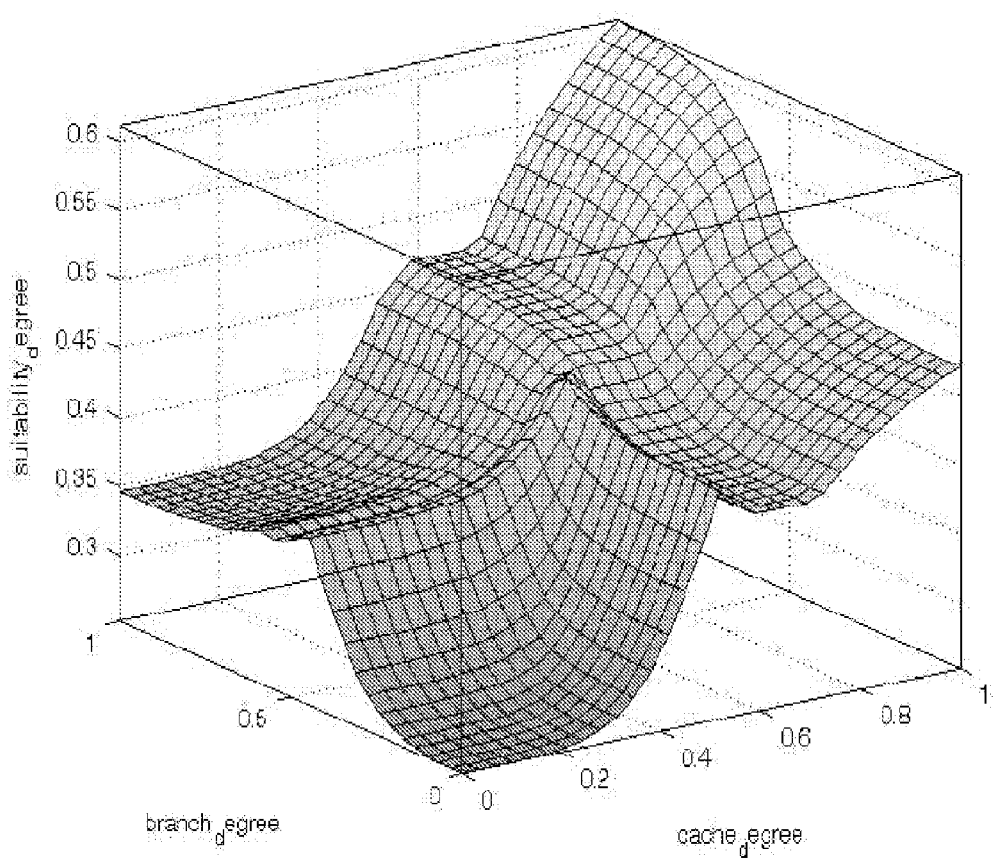

Table I illustrates a non-limiting example of the rules employed in an exemplary fuzzy inference system. Each rule can establish a mapping relationship between individual suitability metrics and the overall suitability metric. For example, if all individual suitability metrics are low, which means the program does not fit the core from any of the aspects defined by the individual suitability metrics, then the overall suitability is lowest, or extremely low (EL). Similarly, if all individual suitability metrics are high, then the overall suitability is highest or extremely high (EH). When L2 cache is not considered, the instruction issue width can have an impact on the execution efficiency of the program, followed by the L1 cache size and the branch predictor. Therefore, other rules can be designed such that the three fuzzy variables in the IF conditions have different priorities, with "issue width suitability" the highest, and the "branch predictor suitability" the lowest. FIGS. 6A-6C are non-limiting examples of the response surfaces of these rules. As shown in FIGS. 6A-6C, three subfigures can be used to display the overall response surface of a three-input fuzzy inference system. Each subfigure can have two input variables, and the third input can be set to zero.

TABLE I

Rules of a Fuzzy Inference System

| IF | THEN |
|---|---|
| (issue width suitability is low) AND (cache suitability is low) AND (branch predictor suitability is low) | (overall suitability is EL) |
| (issue width suitability is low) AND (cache suitability is low) AND (branch predictor suitability is high) | (overall suitability is VL) |
| (issue width suitability is low) AND (cache suitability is high) AND (branch predictor suitability is low) | (overall suitability is L) |
| (issue width suitability is high) AND (cache suitability is low) AND (branch predictor suitability is low) | (overall suitability is ML) |
| (issue width suitability is low) AND (cache suitability is high) AND (branch predictor suitability is high) | (overall suitability is MH) |
| (issue width suitability is high) AND (cache suitability is low) AND (branch predictor suitability is high) | (overall suitability is H) |
| (issue width suitability is high) AND (cache suitability is high) AND (branch predictor suitability is low) | (overall suitability is VH) |
| (issue width suitability is high) AND (cache suitability is high) AND (branch predictor suitability is high) | (overall suitability is EH) |

For example, a hypothetical single-ISA heterogeneous multi-core processor with four different cores can be used, where the configurations of these cores demonstrate enough heterogeneity such that the mapping of a program to different cores can yield noticeable difference in terms of performance and energy consumption. Note, while the methods and systems described herein focus on out-of-order superscalar processor cores with variations in instruction issue width, L1 data cache size and branch predictor size, the disclosed methods and systems are not limited to such processor cores. A plurality of different cores, ranging from ASIC accelerators to VLIW processors can benefit from the methods and systems described herein.

TABLE II

Configuration Options for Three Key Parameters

| Items | Configuration Options |
|---|---|
| Issue Width | single-issue, 2-issue, 4-issue, 8-issue |
| L1 D-Cache | 16 KB, 4-way, block size 64 byte, 32 KB, 4-way, block size 64 byte, 64 KB, 4-way, block size 64 byte, 128 KB, 4-way, block size 64 byte |
| Branch Predictor | 1K Gshare, 2K Gshare, 4K Gshare, 8K Gshare |

Table II is a non-limiting example of configuration options of three parameters of an exemplary processor. To be consistent with the examples made in other sections herein, each parameter has 4 possible options, leading to 48 possible core configurations. Both Xi and Bi (i=1.4), which are the x coordinates of the nodes representing the issue widths and branch predictor sizes, can be assigned 0.125, 0.25, 0.5, and 1 such that the suitability metric can be in the range of [0,1]. These configurations can be used to evaluate the effectiveness of the proposed suitability metrics. Additionally, the heterogeneous quad-core processor can be composed, based on Table II, to evaluate the effectiveness of the proposed suitability-guided program scheduling. The configurations of these cores are listed in Table III. Each core has a private 512K L2 cache with a hit latency of 12 cycles, and a miss latency of 100 cycles. In yet another embodiment, other parameters, such as the load/store queue size and the number of arithmetic logical units (ALUs) can be selected such that the design of the core is balanced.

TABLE III

Core Configurations for Multi-core Processor

| Items | Configurations |
|---|---|
| Core 1 | Out-of-order, 2-issue, Gshare (1k), 16k 4-way d-cache 64 byte, 32k 2-way i-cache 64 byte, 512k L2 cache |
| Core 2 | Out-of-order, 2-issue, Gshare (2k), 32k 4-way d-cache 64 byte, 32k 2-way i-cache 64 byte, 512k L2 cache |
| Core 3 | Out-of-order, 4-issue, Gshare (4k), 32k 4-way d-cache 64 byte, 32k 2-way i-cache 64 byte, 512k L2 cache |
| Core 4 | Out-of-order, 8-issue, Gshare (8k), 64k 4-way d-cache 64 byte, 32k 2-way i-cache 64 byte, 512k L2 cache |

Method

Figure 7:
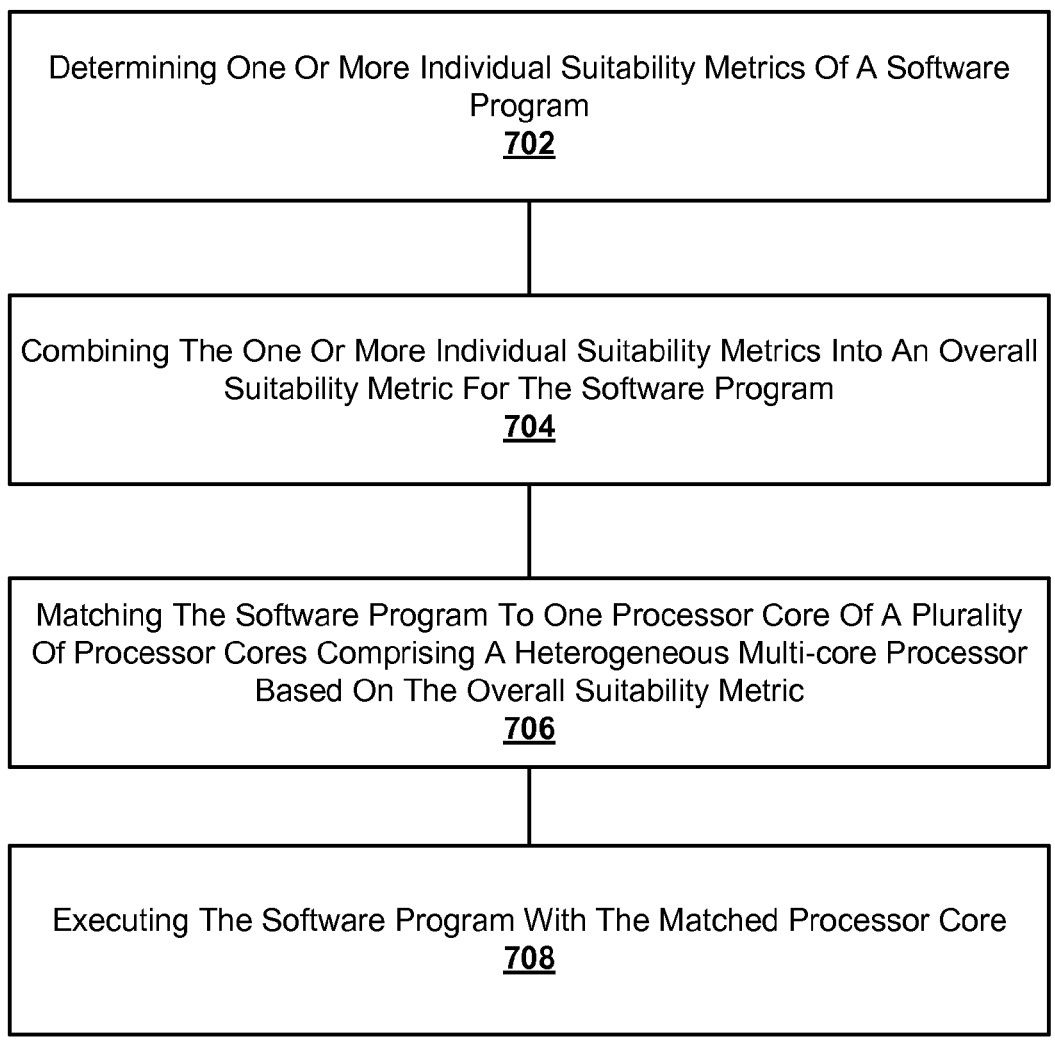
FIG. 7 is a flowchart illustrating a method for scheduling software programs on a heterogeneous multi-core processor according to one embodiment of the present invention.

FIG. 7 is a flowchart illustrating a method for scheduling software programs on a heterogeneous multi-core processor according to one embodiment of the present invention. Step 702 comprises determining one or more individual suitability metrics of a software program. As described herein, the one or more individual suitability metrics can comprise for example an issue width suitability metric of the software program, a branch predictor suitability metric of the software program, or a cache suitability metric of the software program. At step 704 the one or more individual suitability metrics are combined into an overall suitability metric for the software program. For example, this can comprise applying fuzzy logic, as described herein. At step 706, the software program is matched to one processor core of a plurality of processor cores comprising a heterogeneous multi-core processor based on the overall suitability metric. At step 708, the software program is executed by the matched processor core.

EXAMPLES

The examples described herein are put forth so as to provide those of ordinary skill in the art with a complete disclosure and description of how the system and/or methods claimed herein are designed and evaluated, and are intended to be purely exemplary and are not intended to limit the scope of the methods and systems. To demonstrate the effectiveness of the suitability-based program scheduling in heterogeneous multi-core, the quality of the individual suitability metric as well as the effectiveness of the overall suitability in guiding the program scheduling were evaluated. The experimental results for these two evaluations are described herein.

Evaluation of Individual Suitability

Figure 8:
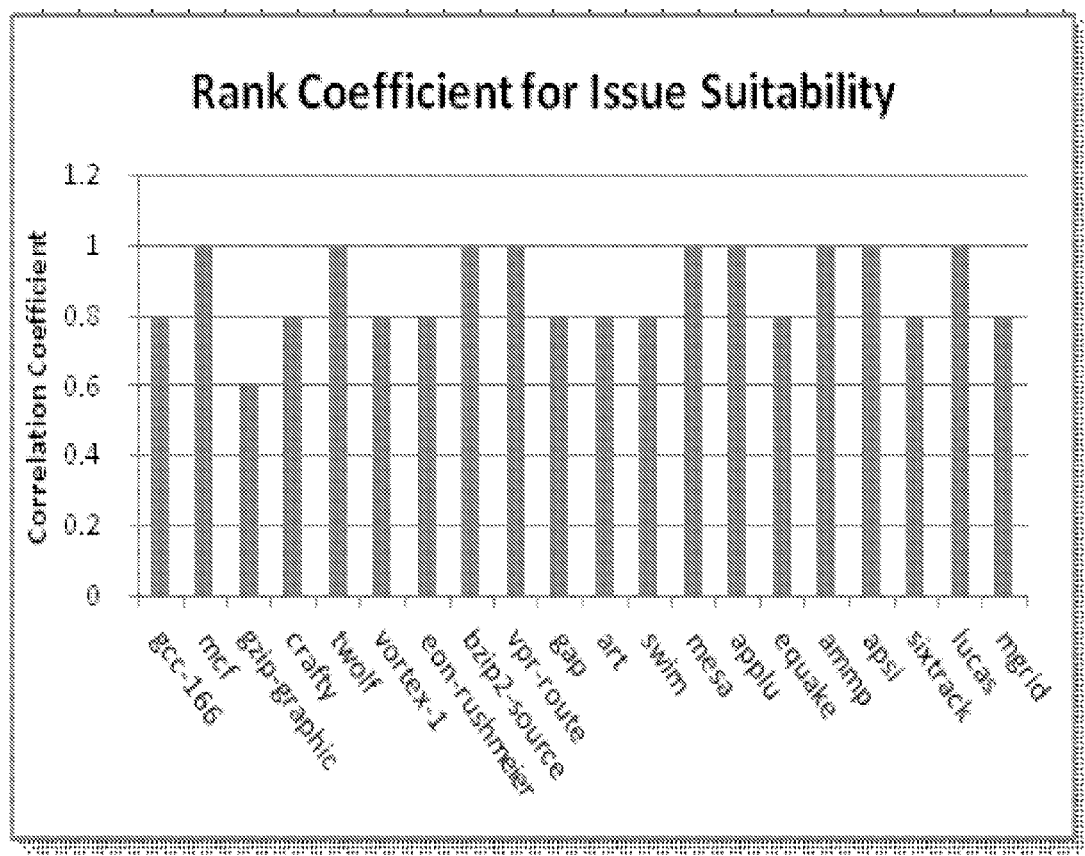
FIG. 8 illustrates a simplified, non-limiting example of rank correlation coefficients between the rank according to issue width suitability and the rank according to simulated EDP.

To evaluate the instruction issue width suitability metric, four cores with different instruction issue widths were selected. The issue width suitability was calculated according to the equation (1) and the cores ranked according to the calculated suitability for each benchmark program. Additionally, simulations of each benchmark program on these cores were performed to obtain the corresponding EDPs, and the cores ranked according to the simulated EDPs. A correlation coefficient was used to measure the quality of the issue width suitability metric, that is, how close the rank according to issue width suitability matched the rank according to the simulated EDP. FIG. 8 illustrates the rank correlation coefficient of each benchmark program. Nine out of the 20 benchmark programs have the correlation coefficient of 1, which indicates a match. The smallest observed rank correlation coefficient is 0.6. It can be noted that with four cores, the worst case rank correlation coefficient was −1. Therefore, the issue width suitability captured the match between the program's ILP and the issue width with a high accuracy.

Figure 9:
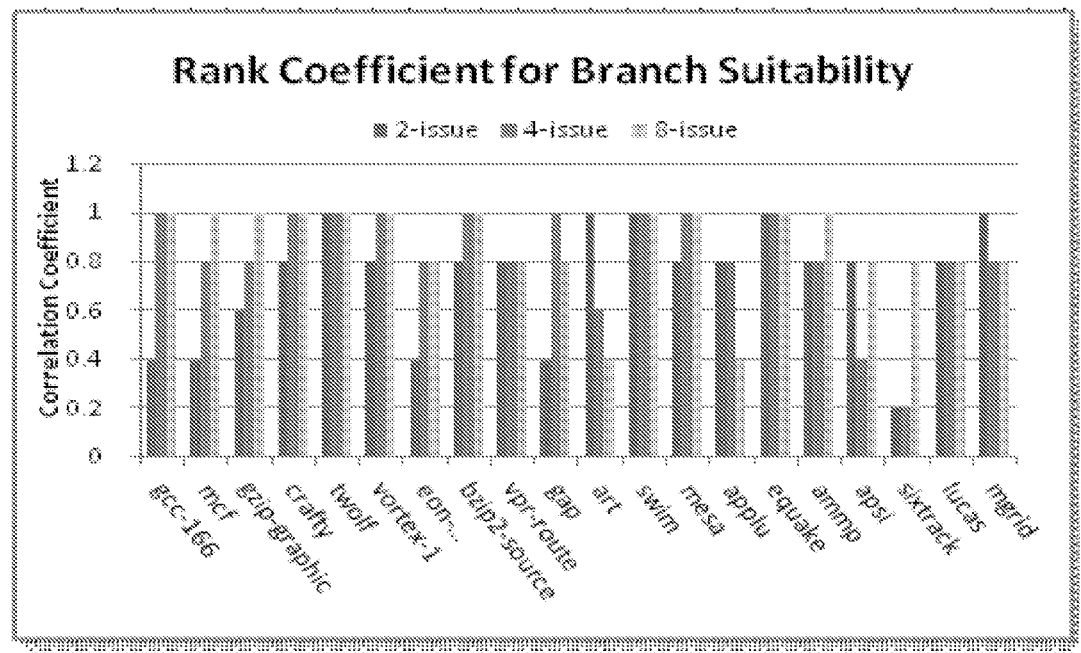
FIG. 9 illustrates a simplified, non-limiting example of rank correlation coefficients between the rank according to branch predictor suitability and the rank according to simulated EDP.

Similarly, to evaluate the branch predictor suitability metric, three groups of processor cores were selected. With the remaining hardware configurations unchanged across the cores, each group was a collection of four cores with different branch predictors (as shown in Table II). The cores from different groups had different instruction issue widths, ranging from two to eight. The branch predictor suitability was calculated according to Equation (2) and the cores ranked within each group according to the calculated suitability for each benchmark program. The correlation coefficients were calculated between these ranks and the ranks according to the simulated EDP within each group. As shown in FIG. 9, the smallest observed correlation coefficient was 0.2 (sixtrack), and most of the other benchmark programs had a coefficient above 0.8. Additionally, as the issue width increased, the correlation coefficient increased or remained the same for many benchmark programs, which demonstrates the effectiveness of the weight introduced in Equation (2). Programs like art and applu (SPEC benchmarks) exhibited an opposite trend with the other benchmark programs. This was because programs like art and applu have a small optimum branch history length, and as the history length becomes larger, the branch predictor becomes less accurate, which can be opposite of the assumptions made in the branch predictor suitability model. Nevertheless, the branch predictor suitability provides a good measurement of the match between the program's branch predictability and the branch predictor size.

To evaluate the cache suitability metric, four cores with different L1 data cache sizes were selected, and the methods employed to evaluate the suitability of instruction issue width to obtain the rank correlation coefficient. The rank correlation coefficient was observed to be 1.0 for each benchmark program, meaning the cache suitability metric properly captured the efficiency of L1 data cache. As each L1 cache size doubled, the power consumption almost doubled yet the performance gain was much less. This effect of diminishing return can be captured in Equation (3).

Evaluation of Overall Suitability

Figure 10:
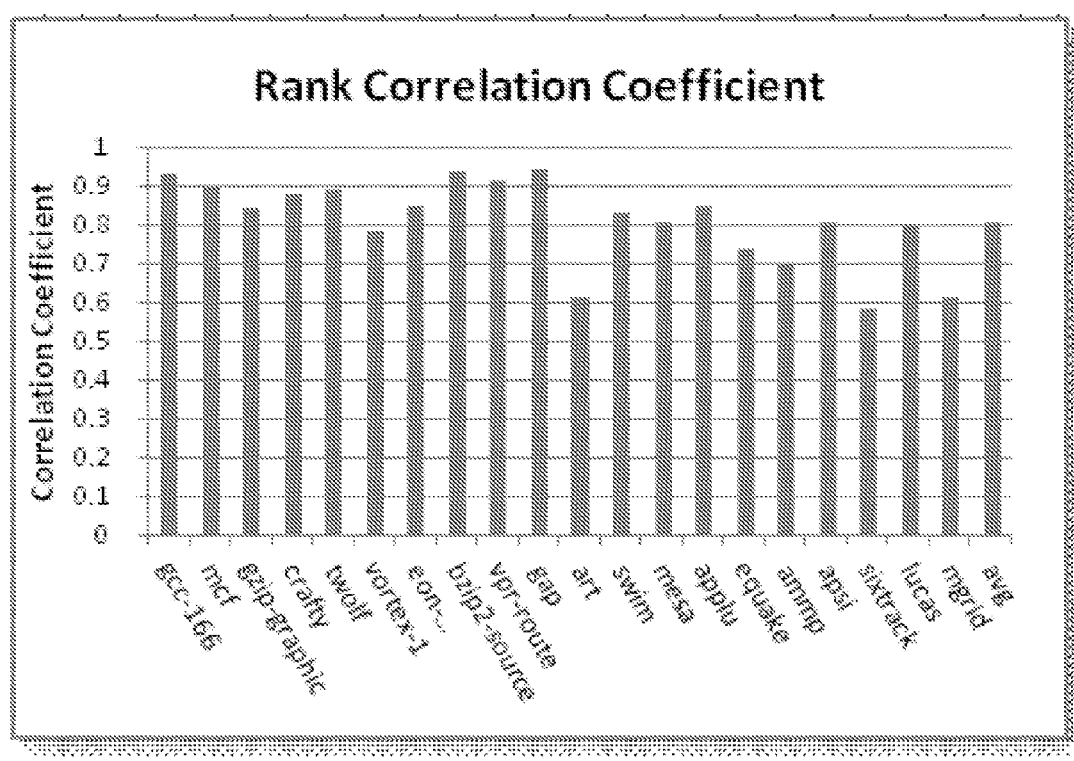
FIG. 10 illustrates a simplified, non-limiting example of rank correlation coefficients between the ranks according to the overall suitability and the ranks according to the overall simulated EDP.

One objective of the overall suitability metric can be to guide program scheduling in a heterogeneous multi-core processor to minimize the total energy delay. In order to evaluate the quality of the overall suitability, each program on each of the 48 possible cores was executed and the cores ranked in terms of the simulated EDPs. These cores were ranked according to the overall suitability of each program-core pair. FIG. 10 shows the rank correlation coefficient of the two sets of ranks. The minimum observed coefficient is 0.58, and the average coefficient is 0.81. This result shows the overall suitability captured the match between programs and cores with a high quality.

Figure 11:
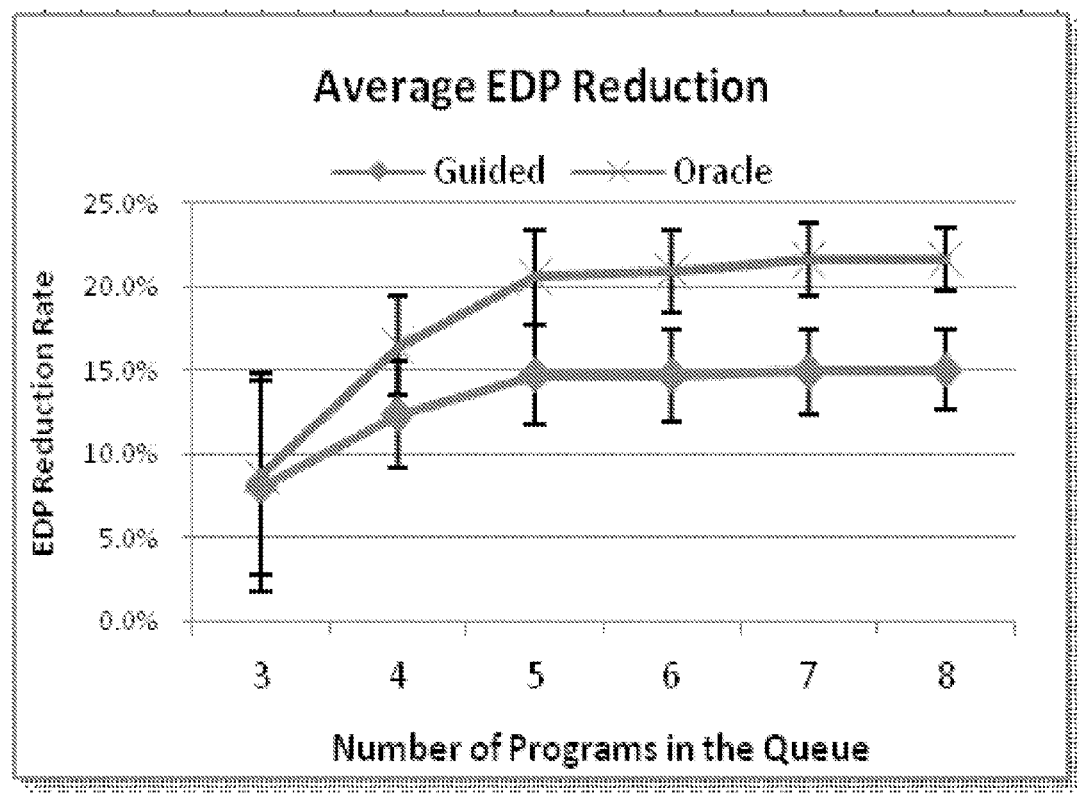
FIG. 11 illustrates a simplified, non-limiting example of the average EDP reduction rates achieved with the suitability guided program scheduling and with the oracle scheduling when compared with that of the random scheduling.

To evaluate the effectiveness of the overall suitability metric in program scheduling, three to eight programs from the benchmark suite were randomly selected and scheduled to the cores in a hypothetical heterogeneous quad-core processor, both randomly and under the guidance of the overall suitability metric. The random scheduling method scheduled the program from the top of the queue to core 1, followed by core 2, core 3, and so on. The randomness was achieved by permuting the sequence of the programs in the program queue. The overall suitability metric guided scheduling method sorted the program-core pairs in terms of their overall suitability, and selected the program with the highest rank for the given available core. In the event of a tie, the program in the leading position of the program queue took precedence. The average overall EDP was compared with overall suitability metric guided scheduling against the average EDP with random scheduling. FIG. 11 shows the average EDP reduction achieved by suitability-guided scheduling. Note that the performance of suitability-guided scheduling continuously improved as the number of programs in the queue increased, with the average EDP reduction rate from 8.1% when the program number was three to 15.0% when the program number was eight. As the number of programs to be scheduled increased, it was more likely for the overall suitability metric guided scheduler to find the most suitable program for the available core, hence reducing the overall EDP cost. FIG. 11 also illustrates the average EDP reduction achieved by oracle scheduling. The oracle scheduling assumed that the EDP of each program-core pair was known even before the program was executed on the core. The mechanism of the oracle scheduling was similar to that of the overall suitability metric guided scheduling except that the oracle scheduling used the EDP instead of the overall suitability metric to determine which program in the queue could be scheduled to the available core. The oracle scheduling was an ideal case, and it set an upper bound of what different scheduling heuristics could achieve in average EDP reduction. Note that the average EDP reduction rate of the oracle scheduling increased from 9.0% to 21.6% as the number of the programs in the queue increased from three to eight. In this example, the maximum observed gap between the average EDP reduction of the suitability-guided scheduling and that of the oracle scheduling is 6.6%, indicating the good quality of the overall suitability metric guided scheduling.

Figure 12:
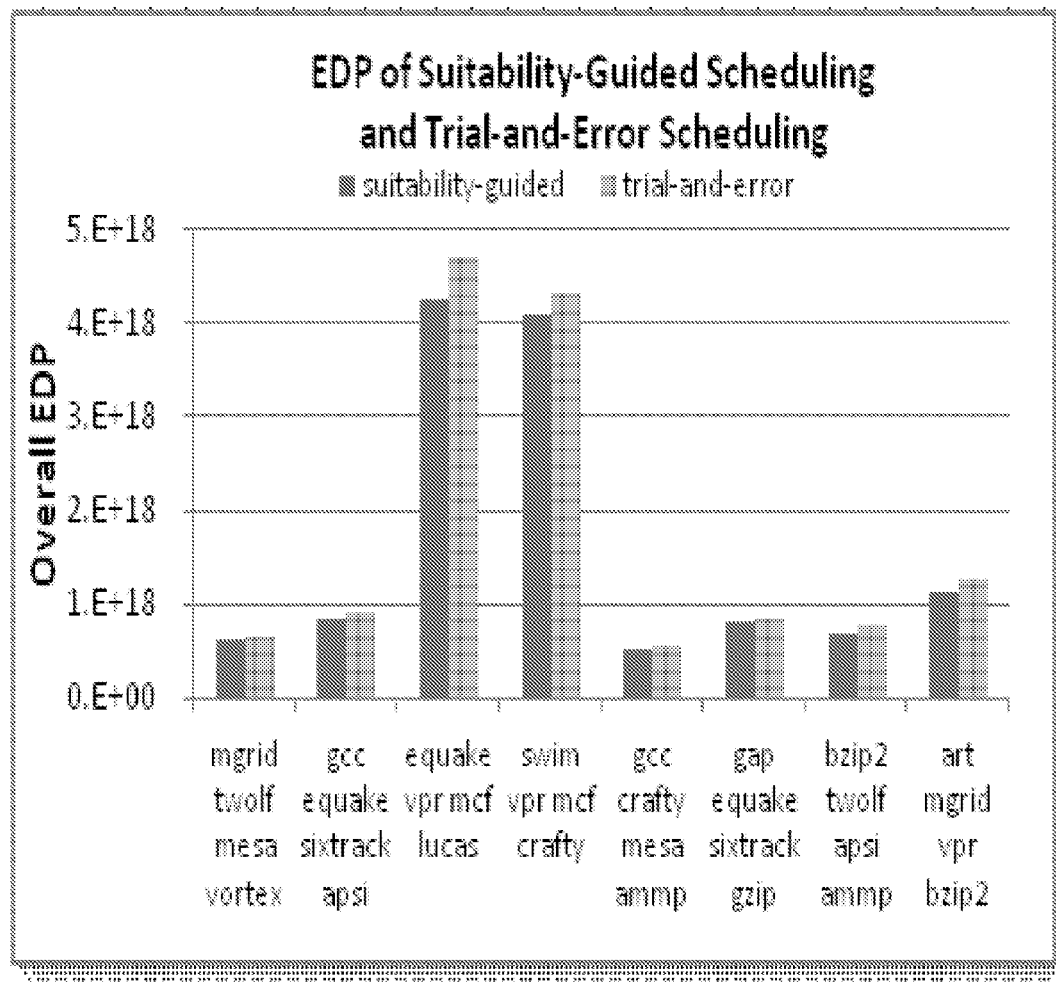
FIG. 12 illustrates a simplified, non-limiting example of an EDP comparison between suitability-guided scheduling and trial-and-error scheduling, wherein each program combination has four programs randomly chosen from a benchmark suite.

The overall suitability metric guided scheduling was compared with trial-and-error scheduling. To implement the trial-and-error scheduling algorithm, the benchmark program was tentatively executed on the cores for the first 2 million instructions and the EDP was sampled during this interval. These sampled EDPs were used to guide the program scheduling such that the program with the minimum sampled EDP in the program queue was scheduled to the available core. When the overall EDP was calculated, the energy and execution time overhead caused by the cache cold start effect during the tentative runs was included. FIG. 12 shows the comparison of EDPs between these two scheduling mechanisms for several benchmark program combinations. As can be seen from FIG. 12, the EDP of the suitability-guided scheduling was less than that of the trial-and-error scheduling. The EDP overhead during the tentative runs significantly degraded the performance of the trial-and-error scheduling. In addition, the sampled EDP during the tentative runs did not accurately represent overall EDP of the entire program phase due to the interference of cold start effects. As a result, the scheduling based on the sampled EDP yielded a large overall EDP of a certain program combination. Moreover, when the context switching overhead in the tentative runs was considered, the performance of trial-and-error scheduling was even worse. Therefore, the overall suitability metric guided scheduling mechanism disclosed herein provided a desirable alternative to the dynamic trial-and-error scheduling.

The proposed method provides a desirable method for achieving stable and low, if not minimal, energy-delay product in the heterogeneous multi-core processor.

While the methods and systems have been described in connection with embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as examples only, with a true scope and spirit being indicated by the following claims.

What is claimed is:

1. A method for scheduling software programs on a heterogeneous multi-core processor, wherein the multi-core processor consists of a plurality of processor cores with different configurations in issue width, branch predictor size, and L1 cache size, comprising:
    determining one or more individual suitability metrics of a software program from the software programs wherein each of the one or more individual suitability metrics measures the compatibility of a characteristic of the software program to a particular configuration of the different configurations of a processor core of the plurality of processor cores, wherein determining the one or more individual suitability metrics of the software program comprises at least determining a branch predictor suitability metric by dividing branch instructions in the software program into a plurality of exclusive buckets based on transition rates, wherein the branch predictor suitability metric is the degree of compatibility of a software program's branch predictability to a processor core's branch predictor size;
    combining the one or more individual suitability metrics into an overall suitability metric for the software program to measure the overall compatibility of the program to the overall configuration of the processor core, wherein the overall configuration corresponds to a configuration of the different configurations;
    determining one or more individual suitability metrics of the software program and combining the one or more individual suitability metrics for every program-core pairs, wherein each pair of the program-core pairs is a pairing of a software program of the software programs with a processor core of the plurality of processor cores;
    comparing the overall suitability metrics of all of the program-core pairs;
    matching each software program of the software programs to a processor core of the plurality of processor cores that has the highest suitability metric based on the comparing of the overall suitability metrics of all of the program-core pairs; and
    executing the software programs with the corresponding matched processor core of the plurality of processor cores.

2. The method of claim 1, wherein determining one or more individual suitability metrics of a software program comprises determining an issue width suitability metric of the software program, wherein the said issue width suitability metric is the degree of compatibility of a software program's instruction level parallelism (ILP) to a processor core's issue width.

3. The method of claim 1, wherein determining one or more individual suitability metrics of a software program comprises determining a cache suitability metric of the software program, wherein the said cache suitability metric is the degree of compatibility of a software program's data locality to a processor core's L1 cache size.

4. The method of claim 2, wherein determining the issue width suitability metric of the software program comprises:
    classifying instruction dependency distances into a plurality of exclusive groups based on dependency distance distribution wherein each group in the plurality of groups has a desirable issue width to exploit said group's parallelism; and
    calculating the mass center of the issue width distribution by computing the weighted average of the desirable issue width associated to the group weighted with the percentage of the instructions whose dependency is within the corresponding group;
    computing the issue width suitability metric based on the distance between the said mass center and an issue width index, wherein said distance is a comparison between an application's instruction level parallelism (ILP) and a processor core's issue width.

5. The method of claim 4, wherein computing the issue width suitability metric based on the distance between the said mass center of the issue width distribution and the issue width index comprises determining the mass center of the distribution wherein the mass center indicates where the application is located in the range of issue widths.

6. The method of claim 1, wherein determining the branch predictor suitability metric of the software program comprises:
    associating the buckets with high and low transition rates with a small branch predictor;
    associating the buckets with intermediate transition rates with larger branch predictors;
    calculating the mass center of the transition rate distribution by computing the weighted average of the size of branch predictor associated to a bucket weighted with the percentage of the branch instructions that has transition rate within the corresponding bucket; and
    calculating the branch predictor suitability metric by determining the distance between the said mass center of the transition rate distribution and an index representing the branch predictor size.

7. The method of claim 3, wherein determining the cache suitability metric of the software program comprises:
    grouping data accesses of the software program in terms of reuse distances;
    determining the distribution of the groupings; and calculating the suitability between the locality of the software program and an L1 cache size of each processor core in the heterogeneous multi-core processor.

8. The method of claim 1, wherein combining the one or more individual suitability metrics into an overall suitability metric for a program-core pair comprises applying fuzzy logic.

9. The method of claim 8, wherein applying fuzzy logic comprises:
  converting each individual suitability metric to a plurality of fuzzy sets;
  assigning values in the value range of the overall suitability into a plurality of discrete suitability levels;
  associating each of the said suitability levels with an output membership function; and
  establishing the mapping relationship between the plurality of the said fuzzy sets of individual suitability metrics and the output membership functions.

10. A system for scheduling software programs on a heterogeneous multi-core processor, wherein the multi-core processor consists of a plurality of processor cores with different configurations in issue width, branch predictor size, and L1 cache size, and the said system is comprised of:
  a memory; and
  a processor, wherein said processor is configured to execute computer-executable code comprising the steps of:
    determining one or more individual suitability metrics of a software program from the software programs, wherein each of the one or more individual suitability metrics measures the compatibility of a characteristic of the software program to a particular configuration of the different configurations of a processor core of the plurality of processor cores, wherein determining the one or more individual suitability metrics of the software program comprises at least determining a branch predictor suitability metric by dividing branch instructions in the software program into a plurality of exclusive buckets based on transition rates, wherein the branch predictor suitability metric is the degree of compatibility of a software program's branch predictability to a processor core's branch predictor size;
    combining the one or more individual suitability metrics of the software program into an overall suitability metric for the software program to measure the overall compatibility of the software program to the overall configuration of the processor core, wherein the overall configuration corresponds to a configuration of the different configurations;
    determining one or more individual suitability metrics of the software program and combining the one or more individual suitability metrics for every program-core pairs, wherein each pair of the program-core pairs is a pairing of a software program of the software programs with a processor core of the plurality of processor cores;
    comparing the overall suitability metrics of all of the program-core pairs;
    matching each software program of the software programs to a processor core of the plurality of processor cores that has the highest suitability metric based on the comparing of the overall suitability metrics of all of the program-core pairs; and
    executing the software programs with the corresponding matched processor core of the plurality of processor cores.

11. The system of claim 10, wherein determining one or more individual suitability metrics of a software program comprises determining an issue width suitability metric of the software program, wherein the said issue width suitability metric is the degree of compatibility of a software program's instruction level parallelism (ILP) to a processor core's issue width.

12. The system of claim 10, wherein determining one or more individual suitability metrics of a software program comprises determining a cache suitability metric of the software program, wherein the said cache suitability metric is the degree of compatibility of a software program's data locality to a processor core's L1 cache size.

13. The system of claim 11, wherein determining the issue width suitability metric of the software program comprises:
  classifying instruction dependency distances into a plurality of exclusive groups based on dependency distance distribution wherein each group in the plurality of groups has a desirable issue width to exploit said group's parallelism; and
  calculating the mass center of the issue width distribution by weight averaging the desirable issue width associated to the group with the percentage of the instructions whose dependency is within the corresponding group
  computing the issue width suitability metric based on the distance between the said mass center and an issue width index, wherein said distance is a comparison between an application's instruction level parallelism (ILP) and a processor core's issue width.

14. The system of claim 10, wherein determining the branch predictor suitability metric of the software program comprises:
  associating the buckets with high and low transition rates with a small branch predictor;
  associating the buckets with intermediate transition rates with larger branch predictors;
  calculating the mass center of the transition rate distribution by weight averaging the size of branch predictor associated to a bucket with the percentage of the branch instructions that has transition rate within the corresponding bucket and
  calculating the branch predictor suitability metric by determining the distance between the said mass center of the transition rate distribution and an index representing the branch predictor size.

15. The system of claim 12, wherein determining the cache suitability metric of the software program comprises:
  grouping data accesses of the software program in terms of reuse distances;
  determining the distribution of the groupings; and
  calculating the suitability between the locality of the software program and an L1 cache size of a processor core in the heterogeneous multi-core processor.

16. The system of claim 10, wherein combining the one or more individual suitability metrics into an overall suitability metric for a program-core pair comprises applying fuzzy logic.

17. The system of claim 16, wherein applying fuzzy logic comprises:
  converting each individual suitability metric to a plurality of fuzzy sets;
  dividing the value range of the overall suitability into a plurality of discrete suitability levels;

associating each of said suitability levels with an output membership function and establishing the mapping relationship between the plurality of the said fuzzy sets of individual suitability metrics and the output membership functions.

18. A computer program product comprising computer-executable code sections embodied on a non-transitory computer storage media, for scheduling software programs on a heterogeneous multi-core processor, wherein the multi-core processor consists of a plurality of processor cores with different configurations in issue width, branch predictor size, and L1 cache size, said computer-executable code sections comprising:

a first section for determining one or more individual suitability metrics of a software program from the software programs, wherein each of the one or more individual suitability metrics measures the compatibility of a characteristic of the software program to a particular configuration of the different configurations of a processor core of the plurality of processor cores, wherein determining the one or more individual suitability metrics of the software program comprises at least determining a branch predictor suitability metric by dividing branch instructions in the software program into a plurality of exclusive buckets based on transition rates, wherein the branch predictor suitability metric is the degree of compatibility of a software program's branch predictability to a processor core's branch predictor size;

a second section for combining the one or more individual suitability metrics into an overall suitability metric for the software program to measure the overall compatibility of the software program to the overall configuration of the processor core, wherein the overall configuration corresponds to a configuration of the different configurations; and determining one or more individual suitability metrics of the software program and combining the one or more individual suitability metrics for every program-core pairs, wherein each pair of the program-core pairs is a pairing of a software program of the software programs with a processor core of the plurality of processor cores;

a third section for comparing the overall suitability metrics of all of the program-core pairs; and matching each software program of the software programs to a processor core of the plurality of processor cores that has the highest suitability metric based on the comparing of the overall suitability metrics of all of the program-core pairs; and a fourth section for executing the software programs with the corresponding matched processor core of the plurality of processor cores.

* * * * *